Nov. 15, 1966  D. C. BAKER  3,285,361
NEUTRAL LOCKING AND SAFETY STARTING MEANS FOR VEHICLES
Filed April 15, 1965

INVENTOR:
DONALD C. BAKER
BY: Arthur J. Hansmann
ATTORNEY

United States Patent Office 3,285,361
Patented Nov. 15, 1966

3,285,361
NEUTRAL LOCKING AND SAFETY STARTING MEANS FOR VEHICLES
Donald C. Baker, Burlington, Iowa, assignor to J. I. Case Company, Racine, Wis., a corporation of Wisconsin
Filed Apr. 15, 1965, Ser. No. 448,450
6 Claims. (Cl. 180—82)

This invention relates to a vehicle safety device, and more particularly it relates to a safety device for starting a vehicle and for locking it in a neutral position.

Vehicle safety devices of various forms and purposes are already known. Some of these are utilized to lock or secure the shift lever in a neutral position so that if the operator were to dismount from the vehicle, or make other moves on the vehicle, the shift lever would not be accidentally moved to where it would engage the traction drive of the vehicle. This is therefore significant in agricultural vehicles of the tractor and crawler type vehicles since these vehicles do have projecting shift levers for control of the transmission. Other forms of safety devices are also known, but these still permit the operator to ignore them if he so desires, and the starting of the vehicle or the shifting of the vehicle through the use of the shift lever can still be accomplished even though the safety device is not in its set position.

It is a general object of this invention to overcome the aforementioned problem of having the safety device operative only if the operator so desires it. Thus in accomplishing this particular object, a safety device is provided which does not permit the starting of the vehicle unless the device is in its operative position, and also, the device will require that the shift lever be in the neutral position so that when the vehicle starts there will be no inadvertent transmission of power to the vehicle traction drive.

Another object of this invention is to provide a combined starting and shifting safety device which requires that the shift lever be in the neutral position before the vehicle can be started and which retains the shift lever in the neutral position until the safety device is maneuvered to its inoperative position.

Still a further object of this invention is to provide a safety device which accomplishes the foregoing and which also provides a means for retaining the shift lever in the neutral position when the operator desires to do so, such as when he mounts and dismounts the vehicle or makes any other moves which do not require the shifting of the transmission of the vehicle while the engine is operating.

Still another and significant object of this invention is to provide a safety device which will accomplish the aforementioned objects, but will also be simple to use and of only a minimum inconvenience to the operator so that he will be induced to and be likely to use the safety device. In this particular object, it is fully recognized that the operator may frequently resort to means which will avoid use of a safety device if he can readily do so. In this particular instance, the device herein is so arranged that he cannot readily avoid the use of it, but it is equally important that the device is arranged so that he can readily and conveniently make proper use of it.

Other objects and advantages become apparent upon reading the following description in light of the accompanying drawings, wherein.

Figure 2:
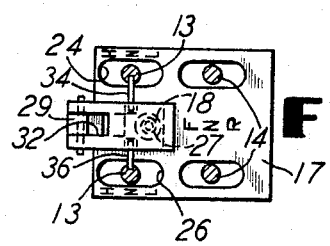
FIG. 2 is a sectional view taken on the line 2—2 of FIG. 1.
Figure 1:
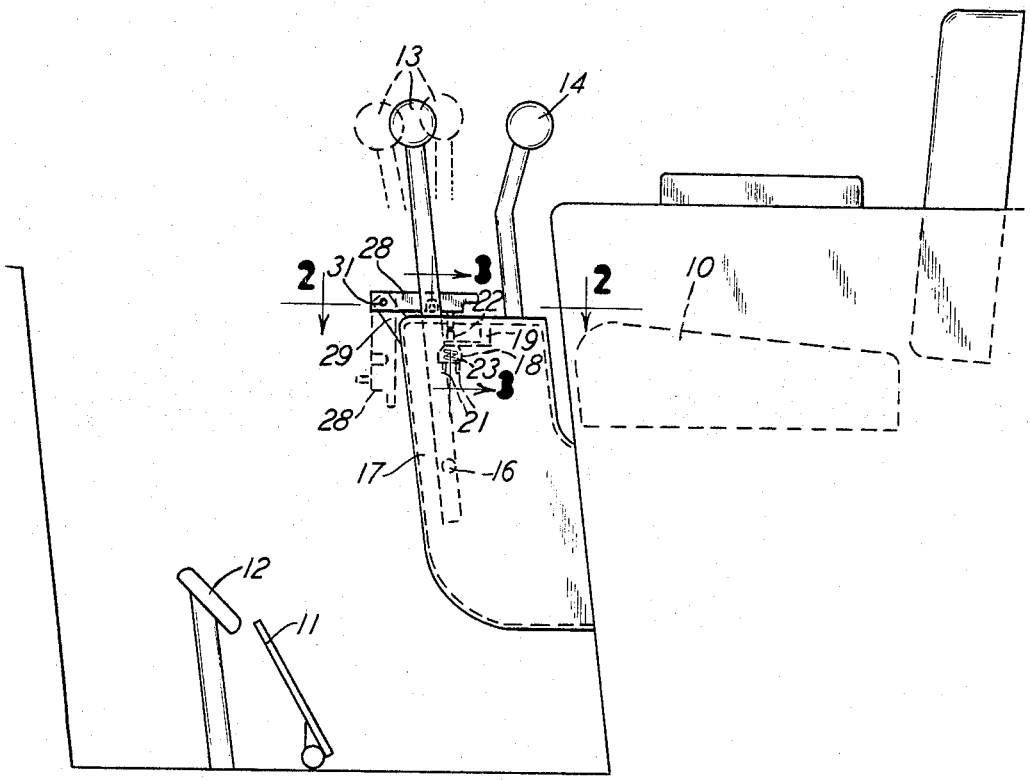
FIG. 1 is a side elevational view of a preferred embodiment of this invention as related to crawler-tractor which is fragmentarily shown.

This invention has application to a crawler-tractor, and accordingly, it will be described in regard to this, and reference may be had to U.S. Patent No. 3,017,941 which shows this type of tractor with the necessary transmission shift levers, brake pedals, power plant or engine, traction drive, and the like. FIG. 1 herein shows a crawler-tractor to include the operator's seat 10 and the foot pedals 11 and 12, shift levers 13 and 14. FIG. 2 shows that the shift levers 13 and 14 are in duplicate for the drive control for each side of the tractor, and the lever 13 may be set forwardly into the position designated "H," which is of course high or fast speed, and it may be set in the positions "N" and "L" which are the neutral and low speed positions. Thus the shift lever 13 on either side of the tractor is independently set in any one of its three designated positions. Also, the shift lever 14 on each side of the tractor may be set in its three positions "F" and "N" and "R" which are the forward, neutral, and reverse positions respectively for each side of the tractor traction drive.

It will also be further understood that the shift levers 13 and 14 are movably or pivotally mounted and extend to control the transmission and thus the traction drive of a tractor in the conventional way which is well known to anyone skilled in the art. Thus, FIG. 1 shows the lever 13 to be pivotally mounted on the shaft designated 16, and the lower end of the lever 13 would extend downwardly to connect to a control or linkage extending to the control means for the traction drive of the tractor. FIG. 1 also shows the shift lever 13 in the high and low positions as indicated by the dotted lines at the upper end of the lever 13, and these dotted positions would thus correspond to the high and low speed drives of the particular side of the crawler-tractor.

A cover or cowl 17 is also mounted on the tractor to enclose the lower ends of the levers 13 and 14 and to also enclose a starter button 18. The button 18 is mounted on the cover 17 by means of a bracket 19 so that the button is fixed except for the conventional actuation of the button by means of one moving part in a well-known manner. The starter button 18 also has electrical contacts designated 21 for connection of wires (not shown) which would of course extend to the battery and the starting motor of the crawler (neither of which is shown).

Figure 3:
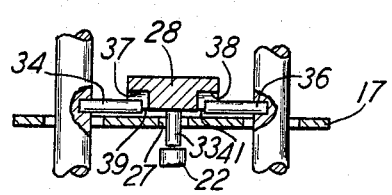
FIG. 3 is an enlarged sectional view taken on the line 3—3 of FIG. 1.

FIGS. 1 and 3 also show that the starter buttton 18 includes the push button 22 at the upper end thereof, and it will be understood that upon depressing the push button 22, the starter button is actuated or in the electrically closed position for completing the circuit to the starting mechanism of the tractor. A return spring 23 is shown in FIG. 1, and this would act on the push button 22 to maintain the starter 18 in the electrically open position normally, and depressing the button 22 would of course compress or flex the spring 23 to close the circuit as would be conventional and well known.

FIGS. 2 and 3 show that the cowling 17 has openings 24 and 26 extending therethrough for clearance of the shift levers 13. The cowling also has a small access opening 27 extending therethrough in alignment with the starter button 18, for a purpose described later. The opening 27 is of a size which does not permit the operator to insert his finger as will be more apparent later also.

A member 28 is pivotally mounted on the cowling 17 by means of a support 29 and a pivot pin 31. Thus the member 28 can pivot between the upper solid line position shown and the lower dotted line position. The former is the operative position and the latter is the inoperative position as will appear hereinafter.

The member 28 has an opening 32 which clears the support 29 so that the member 28 can move or pivot between the two positions shown as it moves in a counter-clockwise position from the solid line position to the dotted line position.

The member 28 has a projection or finger 33 which extends through the access opening 27 and is aligned with the starter button 18 when in the position where the member 28 is operative. It will therefore be understood that when the operator depresses the member 28, the finger 33 contacts the starter button 18 and depresses its push button 22 to close the electric circuit in the starter button 18 and thereby energize the power plant of the tractor. This will then cause the tractor to start operating. As previously mentioned, the operator cannot insert his finger through the opening 27 and actuate the starter button 18, and he must therefore use the safety device through the means of the member 28 to close the contacts on the starter button 18.

Shift levers 13 have projections in the form of roll pins 34 and 36 secured thereto to of course move back and forth with the pivotal movement of the levers 13 and along therewith. The member 28 has notches or openings 37 and 38 which respectively align with the pins 34 and 36 when the shift levers 13 are in the neutral positions. It will now be understood that the shift levers 13 cannot be pivoted or otherwise moved while the member 38 is in the operative position where the member is engaged with the pins 34 and 36. Thus the operator cannot shift the power to the traction drive without moving the member 28 to the inoperative or dotted position shown in FIG. 1, or at least moving it clear of the pins 34 and 36.

Also, the member 28 has its portions or surfaces designated 39 and 41 which will abut the pins 34 and 36 when the shift levers 13 are in any position except the neutral position, that is, when the shift levers 13 are in either the high or low positions. This means that the member 38 will not be locking the shift levers 13 in the neutral position when the pins 34 and 36 interfere with the downward movement of the member 28, and it also means that the tractor cannot be started until the shift levers are placed in the neutral position so that the member 28 can move downwardly a sufficient distance to have its projection 33 contact the starter button. Also, there will be sufficient clearance between the shift lever pins 34 and 36 and the member 28 to permit the latter to lock with the pins 34 and 36, as shown in FIG. 3, but yet not have the member 28 at its maximum downward position which would be a position of starter button engagement. That is, the projection 33 may abut the starter push button 22 without depressing the push button 22, and at that time, the member 28 will also be locked with the pins 34 and 36. There is still sufficient clearance to permit the member 28 to be moved further downwardly to where it will continue to lock with the pins 34 and 36 and will also depress the push button 22 when starting the tractor is desired. The weight of the member 28 does not alone overcome the starter spring 23 to depress the push button 22.

Of course the term starter is used herein to mean a switch, and it does not mean a starter motor or the like.

While a specific embodiment of this invention has been shown and described, it should be obvious that certain changes could be made in the embodiment and the invention should therefore be determined only by the scope of the appended claims.

What is claimed is:

1. A safety device for use with a powered vehicle, comprising a starter button, a movable shift member for controlling transmission of power to the vehicle traction drive and being movable between a neutral position and a traction drive position, a cover adjacent said starter button and disposed to conceal said starter button while having a small opening therethrough aligned with said starter button, a member movably mounted and being operatively associated with said shift member for retaining the latter in said neutral position in one position of said member, and means on said member projecting through said small opening to be operatively associated with said starter button for actuating the latter only when said member is in said one position.

2. A safety device for use with a powered vehicle having a power plant and a traction drive, comprising a starter button, a movable shift member for controlling transmission of power from the power plant to the vehicle traction drive and being movable between a neutral position and a traction drive position, a cover adjacent said starter button and disposed to substantially completely conceal said starter button, said cover having an access opening therethrough aligned with said starter button, a movable member operatively associated with said shift member for retaining the latter in said neutral position in one position of said movable member, means on said movable member projecting through said access opening and into contact with said starter button for actuating the latter when said movable member is in said one position, and means operatively associated between said shift member and said movable member when said shift member is out of said neutral position for preventing said movable member from contacting said starter button.

3. A safety device for use with a powered vehicle having a power plant and a traction drive, comprising a starter button, a movable shift member for controlling transmission of power from the power plant to the vehicle traction drive and being movable between a neutral position and a traction drive position, a cover adjacent said starter button and disposed to substantially completely conceal said starter button, said cover having an access opening therethrough aligned with said starter button and with said access opening being too small for the insertion of a person's finger to actuate said starter button, a movable member operatively associated with said shift member and including means projecting through said access opening and into contact with said starter button for actuating the latter when said movable member is in one position, and means operatively associated between said shift member and said movable member when said shift member is out of said neutral position to prevent said movable member from being in said one position and thereby from contacting said starter button.

4. A safety device for use with a powered vehicle having a movable shift member for selecting drive and neutral positions, comprising a starter button, a cover adjacent said starter button and disposed to substantially completely cover said starter button while having only a small opening therethrough aligned with said starter button, a projection attached to said shift member, a latch member movably mounted and having an opening for receiving said projection of said shift member for retaining the latter in said neutral position in one position of said latch member, said latch member having means for interfering with said projection only when said shift member is in said drive position and thereby prevent said latch member from reaching said one position, and means on said latch member projecting through said small opening to be operatively associated with said starter button for actuating the latter only when said member is in said one position.

5. A safety device for use with a powered vehicle, of the type having a movable shift member for controlling transmission of power to the vehicle traction drive and being movable between a neutral position and a traction drive position, comprising an electric starter button, a cover adjacent said starter button and disposed to substantially completely conceal said starter button while having a small opening therethrough aligned with said starter button, a combined starter button actuator and shift member retaining member movably mounted and being operatively associated with said shift member for retaining the latter in said neutral position only in one position of said combined member, and means on said combined member projecting through said small opening to be operatively associated with said starter button for actuating the latter only when said combined member is in said one position.

6. A safety device for use with a powered vehicle, of the type having a movable shift member for controlling transmission of power to the vehicle traction drive and being movable between a neutral position and a traction drive position, comprising an electric starter button, a cover adjacent said starter button and disposed to substantially completely conceal said starter button while having a small opening therethrough aligned with said starter button, a projection on said shift member, a combined starter button actuator and shift member retaining member movably mounted and having a notch for receiving said projection on said shift member for retaining the latter in said neutral position only in one position of said combined member, means on said combined member projecting through said small opening to be operatively associated with said starter button for actuating the latter only when said combined member is in said one position, and spring means effective on said combined member to urge the latter away from said starter button while having the latter retain said shift member in said neutral position.

References Cited by the Examiner

UNITED STATES PATENTS

| | | | |
|---|---|---|---|
| 1,659,284 | 2/1928 | Smith | 74—483 |
| 1,761,964 | 6/1930 | Ball | 123—179 |
| 2,015,834 | 10/1935 | Banker | 180—82 X |
| 2,647,178 | 7/1953 | Handy | 200—61.54 |
| 2,811,598 | 10/1957 | Brown | 200—61.54 |
| 2,848,988 | 8/1958 | Binder | 123—179 |
| 3,017,941 | 1/1962 | Baker | 180—6.2 |

KENNETH H. BETTS, *Primary Examiner.*